F. W. HUNT.

Improvement in Refrigerators.

No. 4,789. Reissued March 5, 1872.

Witnesses.

H. L. Perrine

John B. Morse

Inventor.

Francis W. Hunt

THE NORRIS PETERS CO., PHOTO-LITHO., WASHINGTON, D. C.

UNITED STATES PATENT OFFICE.

FRANCIS W. HUNT, OF EAST ORANGE, NEW JERSEY.

IMPROVEMENT IN REFRIGERATORS.

Specification forming part of Letters Patent No. 103,336, dated May 24, 1870; reissue No. 4,789, dated March 5, 1872.

*To all whom it may concern:*

Figure 1:
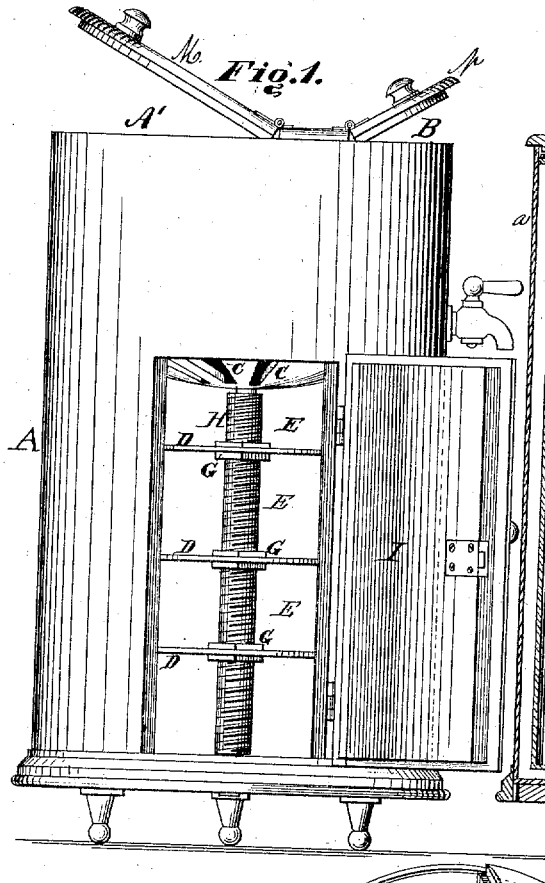
Figure 2:
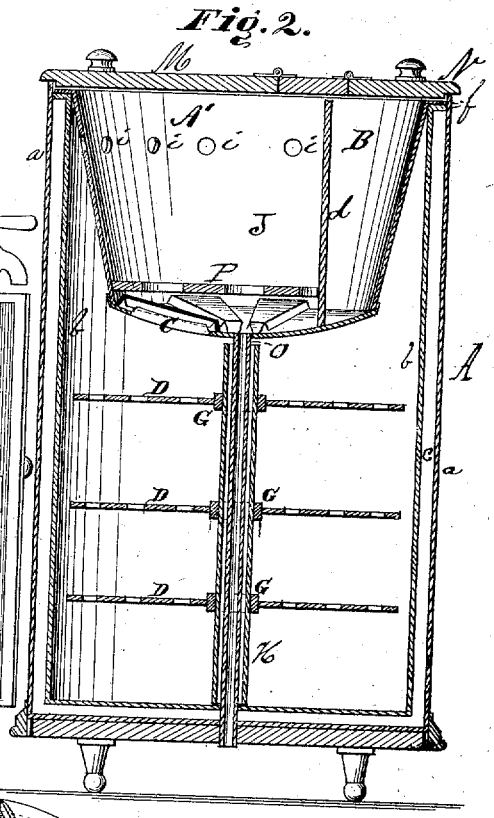
Figure 3:
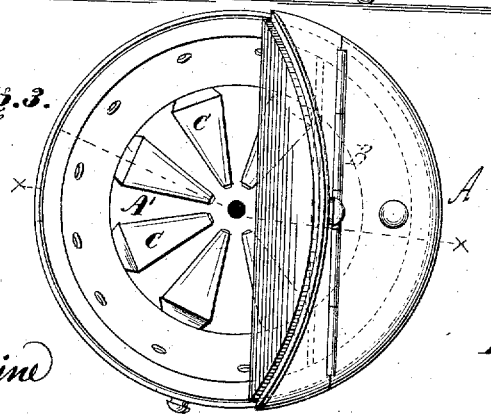

Be it known that I, FRANCIS W. HUNT, of Brooklyn, in the county of Kings and State of New York, have invented a new and useful Improvement in Refrigerators, of which the following is a specification:

In the drawing, Figure 1 is a vertical front view, the cover of the ice-chamber, the water-cooler, and the door of the refrigerator being partly thrown open. Fig. 2 is a central vertical section of the improved refrigerator, showing the ice-chamber, the water-cooler, and the rotating shelves. Fig. 3 is a top view.

Similar letters of reference indicate corresponding parts in the several figures.

My invention relates to certain improvements in refrigerators; and it consists in combining with a refrigerator a series of rotating or revolving shelves, which are adapted to be adjusted vertically with reference to each other. It further consists of a series of shelves arranged within the provison-chamber of a refrigerator, so as to be adjusted up and down and held in position by means of screw-threads or set-screws. It further consists of the combination of a central waste-water tube with the provision-chamber of a refrigerator, and with an elevated or suspended ice-chamber, having a concave bottom and covered openings. It further consists of a combination of parts, as specified hereinafter.

In the drawing, the letter A designates the body of refrigerator, which may be of any desirable form; but, by preference, is made cylindrical. The outside portion *a* is made of galvanized iron, (though other material may be employed,) and is provided with an inner lining or partition, *b*, so as to leave an intermediate air-tight space, *c*, between the two. An opening is made in the side of the refrigerator-body, by which access is had to what is termed the provision-chamber E. Within the provision-chamber E is arranged a vertical shaft or support, H, which is made hollow for a purpose hereinafter mentioned. Upon this shaft is mounted or secured a series of shelves, D D, which are adapted to be rotated or revolved on the axis H. The shelves are arranged within the provision-chamber, and are adjusted vertically with reference to each other, and also in reference to the cooling-chamber, and retained in position by set-screws or by screw-threads upon their support. Above the provision-chamber E in the upper portion of the refrigerator is arranged the compartment J. This compartment is divided into two parts by a partition, *d*, whereby is formed an ice or cooling chamber, A′, and a cold-water chamber or water-cooler, B, the whole being supported by the flange *f* on the lining *b*. These chambers are provided with doors or lids M N. This ice or cooling compartment is provided with a concave bottom, and at or about the center of which is an opening communicating with a hollow support or pipe, O, which extends down through the shelf-support or axis H, and through the bottom of the refrigerator, so that water from the melted ice will be conducted down through the provision-chamber into a vessel or other medium to receive the same. A false perforated bottom, P, is arranged within the cooling-chamber A′, and rests upon suitable supports or upon the inside surface of the chamber J. Covered openings C having flanges *e e* upon their edges are arranged in the bottom of the cylinder, so as to prevent the waste water from running down into the provision-chamber. A series of perforations or openings, *i i*, are formed in the body of the ice or cooling chamber near its top, through which and the openings in the bottom of the said chamber cold air passes and circulates in the provision-chamber, thus refrigerating the articles contained therein. The cold-water chamber may contain ice, but will be kept cool by the action of the ice in the cooling-chamber.

Having thus described my invention, what I claim as new, and desire to secure by Letters Patent, is—

1. A refrigerator provided with adjustable revolving shelves.

2. The provision-chamber of a refrigerator, provided with a series of rotating or revolving shelves, arranged so as to be adjusted up and down and held in the position desired on a shaft or support by means of thumb-screws or by screw-threads formed on the said shaft.

3. In combination with the provision-chamber of a refrigerator, having the central tube or hollow shaft O, I claim the elongated ice-chamber, having its concave bottom formed with covered openings, substantially as described.

4. The ice-chamber A′ and cold-water chamber B, in combination with the provision-chamber E, shaft and tube O, and revolving shelves D, substantially as described.

5. The combined ice and cold-water chamber J, having air-circulating openings, as described, and suspended in the top of a refrigerator by means of the flange-support *f*, in combination with the provision-chamber and adjustable shelves, substantially as described.

To the within specification I have signed my name this 3d day of January, A D. 1872.

FRANCIS W. HUNT.

Witnesses:

WM. BRADSHAW,

A. P. YOUNG.